United States Patent
Eisenman (10) Patent No.: US 10,965,394 B1
(45) Date of Patent: Mar. 30, 2021

(54) COMMUNICATION SYSTEM HAVING SELECTABLE HOPPING RATE AND HOPPING FREQUENCY WINDOW AND ASSOCIATED METHODS

(71) Applicant: HARRIS GLOBAL COMMUNICATIONS, INC., Albany, NY (US)

(72) Inventor: Shane B. Eisenman, Rochester, NY (US)

(73) Assignee: HARRIS GLOBAL COMMUNICATIONS, INC., Albany, NY (US)

( * ) Notice: Subject to any disclaimer, the term of this patent is extended or adjusted under 35 U.S.C. 154(b) by 0 days.

(21) Appl. No.: 16/853,795

(22) Filed: Apr. 21, 2020

(51) Int. Cl.
| | |
|---|---|
| H04B 1/69 | (2011.01) |
| H04B 1/707 | (2011.01) |
| H04B 1/713 | (2011.01) |
| H04K 3/00 | (2006.01) |
| H04B 1/715 | (2011.01) |
| H04B 1/7136 | (2011.01) |

(52) U.S. Cl.
CPC .............. *H04K 3/42* (2013.01); *H04B 1/715* (2013.01); *H04B 1/7136* (2013.01); *H04K 3/45* (2013.01); *H04B 2001/71365* (2013.01)

(58) Field of Classification Search
CPC . H04K 3/42; H04K 3/45; H04B 1/715; H04B 1/7136; H04B 7/12; H04B 2001/71365; H04L 1/0025
USPC .................................................. 375/132–137
See application file for complete search history.

(56) References Cited

U.S. PATENT DOCUMENTS

| | | | |
|---|---|---|---|
| 5,862,171 A | 1/1999 | Mahany | |
| 6,941,110 B2 | 9/2005 | Kloper et al. | |
| 7,280,580 B1 | 10/2007 | Haartsen | |
| 8,842,630 B2 | 9/2014 | Shaffer et al. | |
| 10,313,992 B2 | 6/2019 | Marvel | |
| 10,382,160 B2 | 8/2019 | Kühne et al. | |
| 2002/0176482 A1* | 11/2002 | Chien | H04L 1/0025 375/132 |
| 2002/0186749 A1 | 12/2002 | Jones | |
| 2008/0198902 A1* | 8/2008 | Malladi | H04B 7/12 375/134 |

OTHER PUBLICATIONS

Hanawai et al., "Joint Adaptation of Frequency Hopping and Transmission Rate for Anti-Jamming Wireless Systems," IEEE Transactions on Mobile Computing, DOI: 10.1109/TMC.2015.2492556, Sep. 2015, pp. 1-15.

Van Huynh et al., "'Jam Me If You Can': Defeating Jammer with Deep Dueling Neural Network Architecture and Ambient Backscattering Augmented Communications," IEEE Journal on Selected Areas in Communications, DOI: 10.1109/JSAC.2019.2933889, Aug. 2019, pp. 1-31.

* cited by examiner

*Primary Examiner* — Phuong Phu
(74) *Attorney, Agent, or Firm* — Allen, Dyer, Doppelt, + Gilchrist, P.A.

(57) ABSTRACT

A communication system may include a radio frequency (RF) detector and an RF transmitter having a selectable hopping rate and a selectable hopping frequency window. A controller may be configured to operate the RF transmitter at a selected hopping rate and at a selected hopping frequency window based upon the RF detector.

27 Claims, 4 Drawing Sheets

COMMUNICATION SYSTEM HAVING SELECTABLE HOPPING RATE AND HOPPING FREQUENCY WINDOW AND ASSOCIATED METHODS

FIELD OF THE INVENTION

The present invention relates to the field of communications, and, more particularly, to frequency hopping communication systems.

BACKGROUND OF THE INVENTION

Wireless communication systems may be susceptible to signal interferers that may degrade, obstruct or disrupt communications to the point where communication becomes difficult or impossible. These signal interferers may be unintentional or intentional. Unintentional interferers include spurious emissions, i.e., radio frequency (RF) spurs, due to the non-linear characteristics in transmitters or unwanted coupling between electronic components. Unintentional intermodulation at the transmitter or receiver may also occur when paired RF spurs on either side of two or more signals appear in a non-linear circuit. Additional unintentional interferers include the harmonics that occur when duplicate copies of a signal appear at some multiple of a fundamental frequency, or co-channel interference that occurs when crosstalk exists between different radio transmitters using the same frequency. In some cases, unintentional adjacent channel interference occurs when RF spurs created by extraneous power from a wireless communications signal exist in an adjacent channel. In more rare cases, a malfunctioning or improperly designed or installed signal booster can cause unintentional out-of-band RF spurs. All these factors result in unintentional signal interference.

Intentional interferers, on the other hand, may be more problematic because jamming devices are intentionally designed to emit RF noise at specific frequencies, such as over different communication bands, overpower signals at a receiver, and block the intended communication signal from reaching the receiver. In some cases, the jammers not only disrupt RF signals, but also operate RF devices that intercept and monitor the intended communications, which may include decrypting intercepted messages. In other examples, one may intentionally monitor and jam communications to assess the operational capability of legitimate transmitters and craft countermeasures when users of legitimate transmitters and receivers adjust their wireless communications to overcome the jamming signal.

There are known techniques used in an attempt to counter a signal jamming. For example, adaptive modulation systems are often employed in direct sequence spread spectrum (DSSS) communications systems by increasing the spread spectrum spreading rate and making a more robust signal constellation as a coding option in the physical layer. It is also possible to modify the link layer and route around jamming to avoid detection and signal exploitation, such as may be employed with a wireless MANET (Mobile Ad Hoc Network). Although these changes in the physical layer or link layer are effective in some cases, the adaptive modulation encoding of the physical layer increases the spreading and may require a more robust constellation that sacrifices the data rate. Routing around the jamming signal in a wireless MANET link layer in some cases is technically not feasible.

Other countermeasures externally amplify the communication signal, for example, using a separate power supply in an attempt to overpower the interfering signals, or employ steerable antennas, such as a single element or array, to achieve directionality and nulling of the interfering signals. Not all equipment allows this function, however. The other countermeasures described above may also be limited because any external signal amplification may be insufficient to overcome the interfering signals and may require a separate power supply, which may be impractical in the field. Antenna arrays are not always practical for small platforms used in mobile applications. For example, a quarter waive antenna in the C, S and L bands is about 2, 3, and 8 centimeters in length respectively. However, at the lower frequencies, e.g., the UHF and VHF frequency ranges used in some wireless communications, the length of the quarter waive antenna increases up to 33 centimeters for UHF communications and 250 centimeters for VHF communications. This may make an antenna array impractical at lower frequencies.

Another technique to counter signal interferers is to employ some form of wireless Frequency-Hopping Spread Spectrum (FHSS) modulation. In an FHSS communication system, radio signals are transmitted by rapidly switching a carrier among many frequency channels, usually based on a pseudorandom sequence known to both the transmitter and receiver. FHSS communication systems therefore spread their signal over rapidly changing frequencies in usually a defined RF bandwidth or frequency spectrum at a fixed hopping frequency window and operating at a fixed hopping rate. Examples include frequency hopping communications, such as in the unlicensed 2.4 GHz frequency spectrum. The available frequency band in FHSS communication systems is usually subdivided into sub-frequencies, and the emitted RF signals rapidly change or "hop" among the sub-frequencies in a predetermined order, but stay within the hopping frequency window and while maintaining the same hopping rate, while only changing the sub-frequencies.

Some wireless FHSS communications systems frequency hop at a fixed rate with a hopping rate that is as fast as the transmitter and receiver can operate within a defined frequency hopping window. Reactive jammers need to operate at that same hopping rate to keep up with the transmitter and receiver. If the hopping rate is faster than what the attempted active jammer technically can accomplish or detect, then there is no need to switch frequencies or the type of communications. If the attempted jammer reacts multiple times when different frequencies are changed, the attempted jammer may end up revealing its location.

Some FHSS communication systems sense the spectrum across a frequency band, i.e., the frequency hopping window, using a dynamic spectrum analyzer (DSA) as an RF detector to determine if interference levels on the frequencies used for hopping are above a threshold and thus causing an unacceptable packet error rate (PER). If a threshold is exceeded, any frequencies subject to interference may be removed from an original hop set to manage the packet error rate. Other frequencies within the frequency hopping window may be substituted for those removed frequencies. Bad frequencies that had been removed may be reassessed and reclaimed periodically to manage the spreading ratio.

Even with these FHSS communication systems, an attempted jammer may passively listen and learn the electronic capabilities used by the legitimate communication transmitters and receivers. The attempted jammer may correct its electronic countermeasure (ECM) capabilities to neutralize the legitimate communication system's capabilities at any given time and place. Further improvements may therefore be needed in FHSS communication systems to overcome attempts to interfere by jamming and listen in on the legitimate FHSS communication systems.

SUMMARY OF THE INVENTION

In general, a communication system may include a radio frequency (RF) detector, an RF transmitter having a selectable hopping rate and a selectable hopping frequency window, and a controller configured to operate the RF transmitter at a selected hopping rate and at a selected hopping frequency window based upon the RF detector.

The controller may be configured to operate the RF transmitter at the selected hopping rate based upon a detected interference from the RF detector. The controller may also be configured to operate the RF transmitter at the selected hopping frequency window based upon a detected interference from the RF detector. The controller may have a hopping rate policy limit settable via an external command device to be less than a hardware hopping rate limit of the RF transmitter, and the selected hopping rate may be within the hopping rate policy limit. The controller may also have a hopping frequency window policy limit settable via an external command device to be less than a hardware hopping frequency window of the RF transmitter, and the selected hopping frequency window may be within the hopping frequency window policy limit.

In an example, the controller may be configured to operate the RF transmitter at a higher selected hopping rate when the RF detector detects a higher interference, and at a lower selected hopping rate when the RF detector detects a lower interference. A remote RF receiver may be in communication with the RF transmitter and may be configured to operate at the selected hopping rate and selected hopping frequency window.

In another example, a communication device may include a portable housing and a radio frequency (RF) detector carried by the portable housing. An RF transmitter may be carried by the portable housing and may have a selectable hopping rate and a selectable hopping frequency window. An RF receiver may be carried by the portable housing. A controller may be carried by the portable housing and configured to operate the RF transmitter at a selected hopping rate, and at a selected hopping frequency window based upon the RF detector.

Another aspect is directed to a method for communication that may comprise using a controller to operate an RF transmitter at a selected hopping rate, and at a selected hopping frequency window based upon an RF detector.

BRIEF DESCRIPTION OF THE DRAWINGS

Other objects, features and advantages of the present invention will become apparent from the detailed description which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout.

Figure 1:
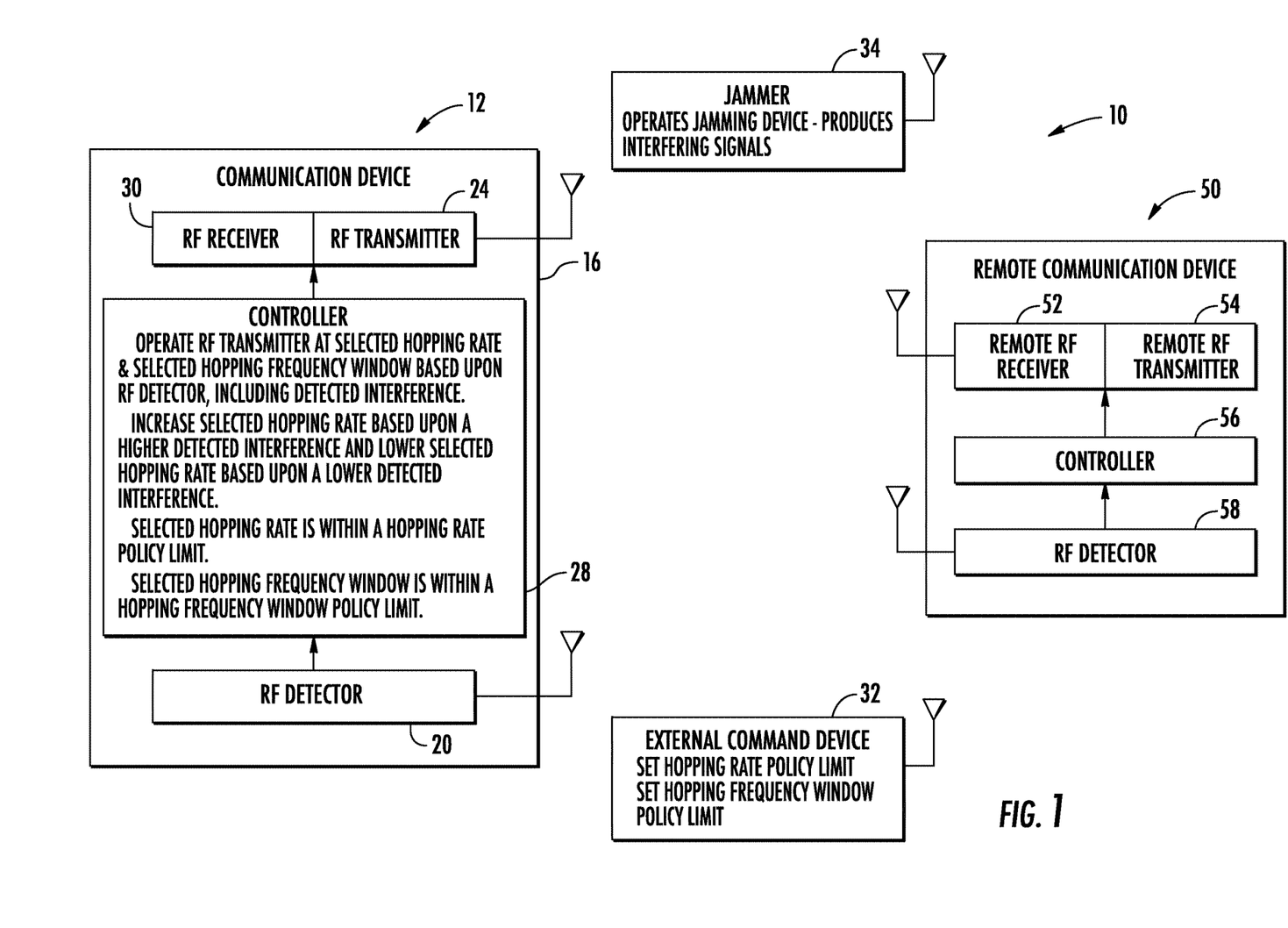
FIG. 1 is a block diagram of the communication system according to an example.

Referring now to FIG. 1, there is illustrated a frequency hopping communication system illustrated generally at 10 that includes a communication device 12 having a portable housing 16 and a radio frequency (RF) detector 20 carried by the portable housing and operable as a dynamic spectrum access device that detects signal energy across a frequency hopping window defined by the RF band or spectrum used for frequency hopping. In an example, the RF detector 20 may detect signal energy at the specific frequencies used for frequency hopping. The communication device 12 is illustrated with the RF detector 20 carried by the portable housing 16, but in other embodiments the RF detector may be separate from the communication device and located remote from the communication device. The communication device 12 includes an RF transmitter 24 having a selectable hopping rate and a selectable hopping frequency window. A controller 28 is coupled to the RF transmitter 24 and configured to operate the RF transmitter at a selected hopping rate and at a selected hopping frequency window based upon the RF detector 20. The communication device 12 also includes an RF receiver 30 connected to the controller 28 and operable to receive RF signals.

In an example, the controller 28 is configured to operate the RF transmitter 24 at a selected hopping rate based on a detected interference from the RF detector 20, and also operate at a selected hopping frequency window based upon a detected interference from the RF detector. The communication device 12 may be in communication with an external command device 32 that may be located remote from the communication device such as at a command base station and operate as a base station controller. The external command device 32 may be a networked or stand-alone device, and the RF detector 20 may be located at or integrated with the external command device, instead of integrated with the communication device 12 as illustrated.

The external command device 32 may set policy limits and communication standards for the frequency hopping communication system 10, including limits on the hopping rate and hopping frequency window. For example, the external command device 32 may transmit instructions to the communication device 12 and have its controller 28 set a both a hopping rate policy limit and hopping frequency window policy limit to be less than the hardware limits of the RF transmitter 24, thus ensuring that any selected hopping rate and hopping frequency window for the communication device is within the hardware limitations of the communication device. It may be desirable to maintain the hopping rate and hopping frequency window well under the hardware limits of the communication device 12 to conceal the hardware limitations of the communication device from a jammer 34, which operates a jamming device and produces interfering signals.

If the communication device 12 is operating at a hopping rate and hopping frequency window close to the operating limits of the hardware within the communication device, a jammer 34 may be able to determine the hardware limits of the communication device, and thus, more easily jam and monitor communications. As the communication device 12 makes changes in response to the jammer's jamming, the jammer 34 may make changes in response. Because of this constant shifting of both the hop rate and the hopping frequency window by a legitimate RF transmitter 24 over time, a jammer 34 may determine the hardware limitations of the legitimate RF transmitter, e.g., the maximum rate of frequency hops and the effective frequency range over which frequency hopping occurs, giving the jammer an advantage not only in jamming signals, but also in intercepting communications. It is desirable for the RF transmitter 24 to increase the hopping rate and hopping frequency limit without revealing the effective hopping rate and frequency range of the communication device 12.

The controller 28 may be configured to operate the RF transmitter 24 at a higher selected hopping rate when the RF detector 20 detects a higher interference at those frequencies on which the RF transmitter 24 is hopping, indicative of jamming signals, and at a lower selected hopping rate when the RF detector 20 detects a lower interference within those frequencies. When the RF detector 20 detects that a greater number of frequencies are being interfered, the controller 28 may initially cause the RF transmitter 24 to change the hop frequencies and remain within the hopping frequency window. If after changing the hop frequencies and substituting new frequencies within the hopping frequency window, there is still interference occurring on some of the new frequencies, and that interference is above a threshold, e.g., 10% to 20% of those frequencies on which there interference, a determination may be made that the interference is intentional interference by an jammer 34 and the controller 28 may select a higher hopping rate as a countermeasure to the jammer's efforts to jam the hopping frequencies. If there is reduced interference later because a jammer 34 may have given up trying to jam the signals or the selected hopping rate has risen above what the jammer can technically initiate, the controller 28 may experiment with a lower hopping rate when the RF detector 20 detects that lower interference. As will be explained in greater detail below, the controller 28 may also increase the hopping frequency window to increase the effective RF band over which the hopping frequencies are spread if increasing the hop rate is found ineffective.

As illustrated, a remote communication device 50 having an RF receiver 52 is in communication with the communication device 12 and receives the RF signals transmitted from the RF transmitter 24 and is configured to operate at the selected hopping rate and selected hopping frequency window. For example, when the controller 28 at the communication device 12 selects a specific hopping rate and hopping frequency window, either the communication device 12 itself or the external command device 32 may transmit that selected hopping rate and selected hopping frequency window to the remote communication device 50 so that the remote communication device makes corresponding changes and operates at the selected hopping rate and selected hopping the window. In an example, the remote communication device 50 includes components similar to the communication device 12 as described above and includes a remote RF receiver 52, a remote RF transmitter 54, controller 56, and RF detector 58 giving in this example the remote communication device 50 the capability of initiating changes to the selected hopping rate and hopping frequency window.

The communication device 12 may operate at different hopping rates, hopping frequencies and hopping frequency windows, including those frequencies associated with Bluetooth, WiFi, ISM, cellular, HF and UHF, and other communications. An example of a portable communications device 12 that may be used includes the L3Harris Falcon III communication device, which has a high-capacity line-of-sight radio with frequency hopping, such as the RF-7850W radio, or a wideband networking handheld radio, such as the AN/PRC-152A or AN/PRC-160 HF-VHF tactical radio.

Figure 2:
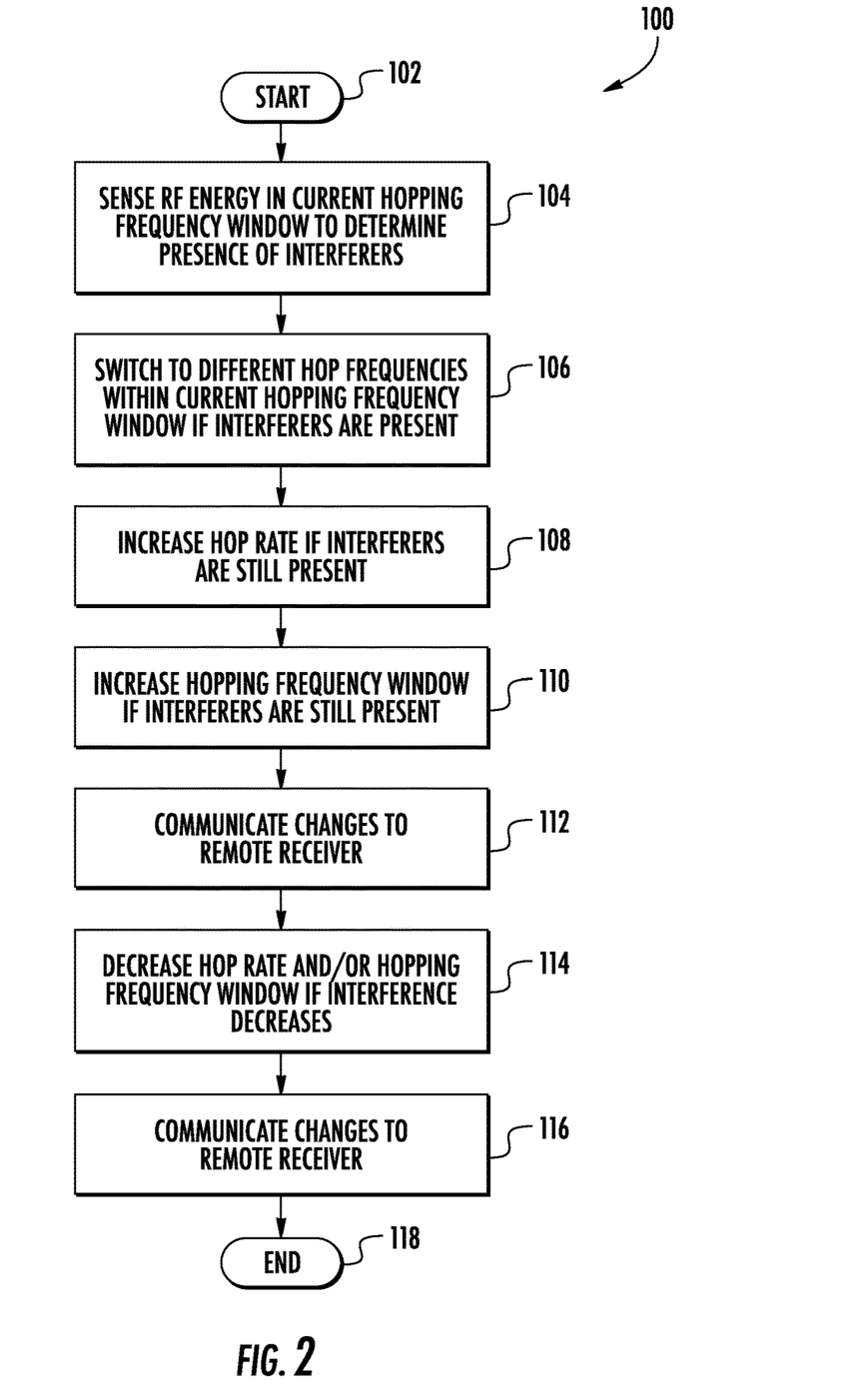
FIG. 2 is a high level flowchart of a method for communication using the communication system of FIG. 1.

Referring now to FIG. 2, there is illustrated generally at 100 a high level flowchart of a method for communication using the communication system 10 shown in FIG. 1 by using the controller 28 to operate the RF transmitter 24 at a selected hopping rate and at a selected hopping frequency window based on the RF detector 20. The process starts (Block 102) and the RF detector 20 senses the RF energy across the RF band as the current hopping frequency window, and more particularly, those frequencies on which the frequency hopping RF signals are transmitted by the RF transmitter 24 (Block 104). The controller 28 analyzes the spectrum data obtained from the RF detector 20 and determines if any interfering energy within the frequencies on which hopping occurs is beyond a threshold indicative of interferers, and if so, the controller may switch to different frequencies within the existing hopping frequency window (Block 106). If switching to different hopping frequencies does not succeed, and an interferer "follows" the change as measured by the RF detector 20, then the controller 28 may increase the hop rate if interferers are still present (Block 108) in an attempt to hop at a faster rate beyond the technical capabilities of a jammer 34. The hopping rate may be increased to a level below the hardware limitations of the communication device 12 so that the changes do not reveal the hardware limitations of the communication device to the jammer 34. If increasing the hopping rate is unsuccessful and an jammer 34 still interferes with the increased frequency hopping signals, then the controller 28 may increase the hopping frequency window as necessary and increase the RF range or energy spectrum over which the frequency hopping occurs (Block 110). The communication device 12 may communicate the changes to the remote communications device 50 having the remote RF receiver 52, which makes the corresponding changes to receive the RF signals (Block 112). After a period of time, when the RF detector 20 measures there is a lack of significant RF jamming energy, and thus, lack of interferers from a jammer 34, the hopping rate and/or hopping frequency window may be decreased (Block 114), which is communicated to a corresponding remote RF receiver and adjustments made (Block 116). The process ends (Block 118).

Figure 3:
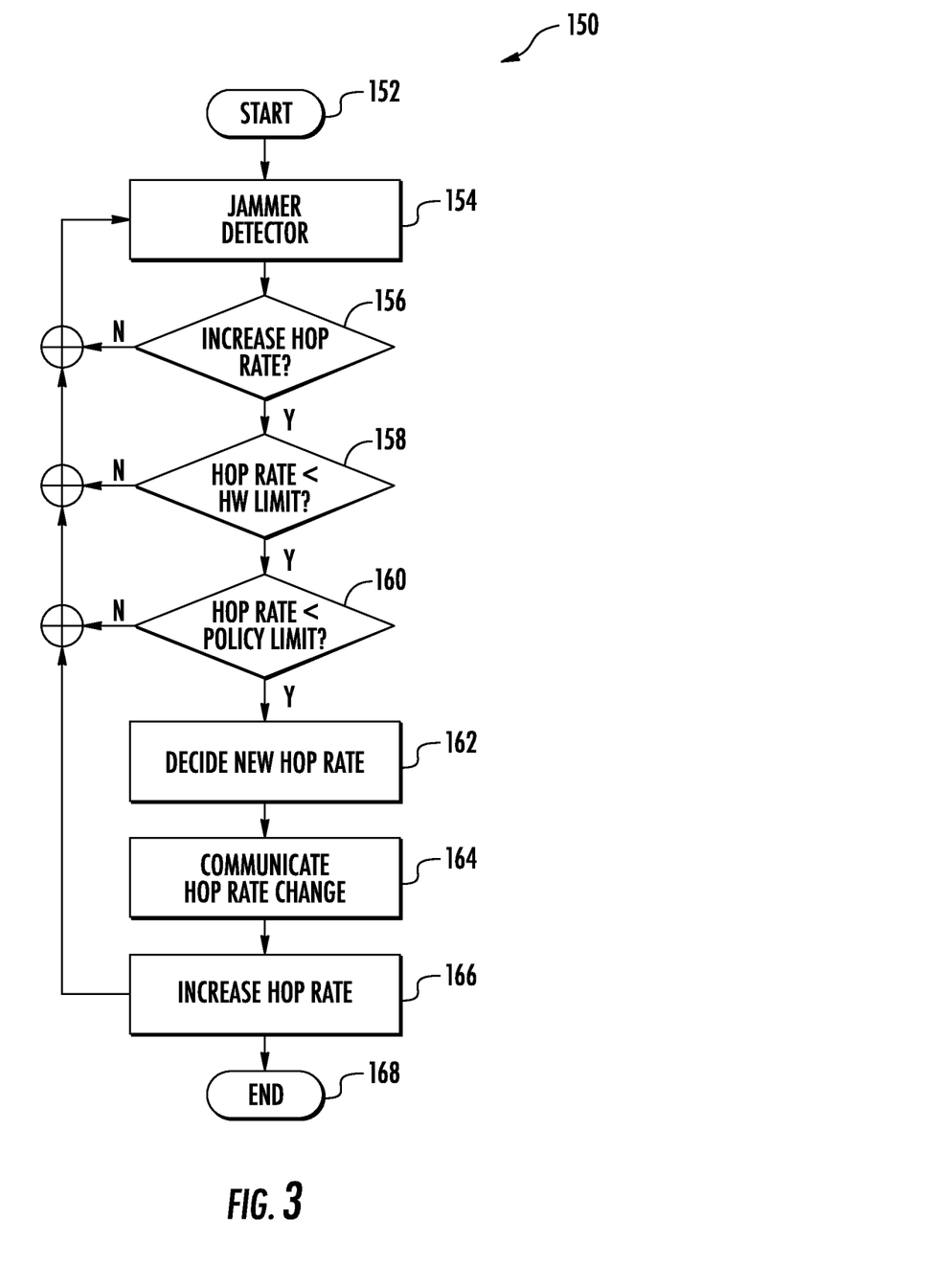
FIG. 3 is a high level flowchart of a method for selecting a hopping rate using the communication system of FIG. 1.

Referring now to FIG. 3, there is illustrated a more detailed flowchart indicated generally at 150 for determining a selected hopping rate. In this example, the flowchart illustrates the process of increasing the hop rate, but the process of reducing the hop rate is based on the same RF spectrum sensing of the RF band of interest, e.g., the hopping frequency window, to maintain a minimum required hop rate. The process starts (Block 152) and the RF detector 20 senses the RF band or energy spectrum within the hopping frequency window, especially on those frequencies over which hopping occurs, and operates as a jammer detector to determine which frequencies are being jammed (Block 154). The controller 28 processes that spectrum data received from the RF detector 20 and determines a probability that the current interference is intentional, and updates any interference data that may have been supplied initially to the communication device 12 regarding what kind of interference is to be expected. For example, the controller 28 may determine that the interference is intentional when a threshold in the packet error rate (PER) is greater than a specific tolerance associated with the communication device 12 for that communication. The controller 28 makes a decision whether to increase the hop rate as a countermeasure to the intentional interference, and if below the threshold, the rate will not be increased (Block 156).

If the hop rate should be increased based upon the obtained spectrum data to a new selected hop rate, then the controller 28 determines whether the new hop rate is less than a hardware limit (Block 158). For example, the communication device 12 may have local oscillator stability limits for precision and coherence, signal loss characteristics at upper hop rates, tuning limitations at upper hop rates, impedance mismatch factors, and/or other hardware limitations that create an upward hardware limit to the hopping rate. If that hardware limit must be exceeded in order to successfully counter the interferer, the hopping rate is not increased. If the selected hop rate is less than the hardware limit for the communication device 12, then a determination is made whether the hop rate is less than a hopping rate policy limit, such as for a current deployment location, time of day, and other factors (Block 160). There may be a hopping rate policy limit of not to raise the hopping rate to a certain level since it may reveal the hardware limit, unless there are special circumstances, such as during times of emergency, or special missions for first responders. If the new hop rate is above the hop rate defined by the hopping rate policy limit, no corresponding increase is made to the hop rate. If the new hop rate is within the hopping rate policy limit, then the hop rate is decided upon (Block 162) and will be increased at a minimum rate that exceeds a demonstrated jammer capability, such as based on an inferred jammer type and capability, without increasing the hop rate at such a rate to reveal the maximum limit of the hop rate for the communication device 12. For example, increases in the hop rate may occur at 5 or 10 KHz increments or other increments set beforehand by the external command device 32. This new hop rate is communicated as a hop rate change to other communication devices such as the remote communications device 50, which may use any existing signaling mechanism to enable the change in the hop rate and synchronize the new hop rate to the remote communication device (Block 164). The hop rate is increased (Block 166) and the process ends (Block 168).

In operation, the RF detector 20 may sense the energy spectrum on hopping frequencies in the existing hopping frequency window over a period L, and migrate to different frequencies for hopping within the existing hopping frequency window if intentional interference is determined to occur on frequencies on which hopping occurs. If the communication device 12 was not initially hopping, the controller 28 may initiate a frequency hopping modulation onto its RF signal. If there had been frequency hopping, and if there are M migrations within the last K periods, the controller 28 may determine that there is "intentional interference." For example, as hopping frequencies are changed and the RF detector 20 determines that continued interference occurs on new frequencies, such as 10% or 20% of those new frequencies, then a jammer 34 may still be tracking and transmitting interfering, jammer signals. In response, the controller 28 may initiate an additive increase of the hop rate per a design constant U, where a new hop rate may be equal to a previous hop rate plus the design constant U. Instead of increasing the hop rate by 1 KHz, for example, 5 KHz frequency hopping jumps may be used, and these frequency hopping jumps may be modified over time. If the jammed or blocked frequency hops have a percentage greater than K periods per measured packet error rate, the controller 28 may determine that there is "intentional interference" and initiates the hop rate increase.

Conversely, if over time the RF detector 20 senses the RF spectrum within the hopping frequency window and the controller 28 determines there is no jamming based upon the received spectrum data, then the controller 28 will periodically test a lower hopping rate and evaluate the observed spectrum data and measured packet error rate to determine if the hop rate should be decreased. The controller 28 may make a multiplicative decrease per a design constant D where the new hop rate equals the previous hop rate divided by the design constant D as an example. The values of L, M, K, U, and D vary and are determined based upon different factors such as the environment where the communications occur and any hop rate policy limits.

Figure 4:
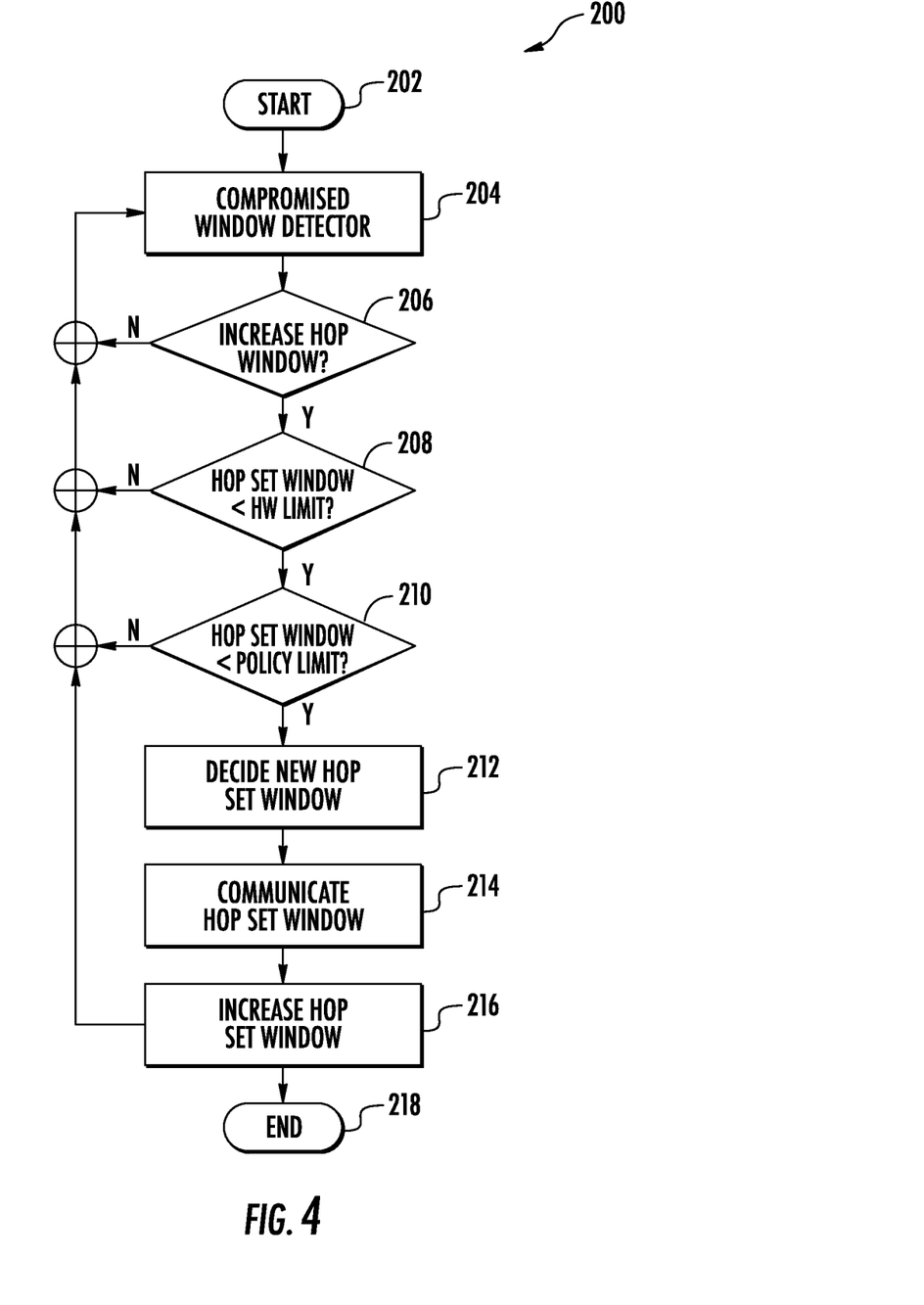
FIG. 4 is a high level flowchart of a method for selecting the hopping frequency window using the communication system of FIG. 1.

Referring now to FIG. 4, there is illustrated generally at 200, a flowchart showing a method for determining if the hopping frequency window, referred to also as the hop set window in FIG. 4, should be adapted and changed. Usually before any determination is made to increase or decrease the hopping frequency window, corresponding changes are made beforehand to the hop rate. The frequency hopping has already been triggered and the hopping rate changed per the sequence described relative to FIG. 3 will have typically occurred before changes are made to the hopping frequency window. In certain cases, however, the hopping frequency window may be changed before the hopping rate is changed. Similar to the method described relative to FIG. 3, the method as described with reference to FIG. 4 shows an example of increasing the selected hopping frequency window based upon the RF detector 20 and is indicated generally at 200.

The process starts (Block 202) and the RF detector 20 operates as the illustrated compromised window detector and senses the RF spectrum within the current hopping frequency window to measure the interference characteristics of the energy spectrum (Block 204). The energy output fraction of the current hopping frequency window may indicate that the hopping frequency window is compromised. The packet error rate may be greater than a predetermined tolerance value, and the controller 28 determines if it is possible to increase the hopping frequency window (Block 206). If the controller 28 determines that the energy output fraction is less than a threshold, however, there is no need to increase the hopping frequency window. The controller 28 next determines whether the selected hopping frequency window as the hop set window is less than the hardware limit for the communication device 12 (Block 208). For example, the new frequency band corresponding to the new hopping frequency window may be greater than what the communication device 12 is technically able to accomplish because of front end circuitry limitations or other component limitations, similar to the hardware limitations of increasing the hop rate beyond a hardware limit.

If the hopping frequency window is less than a hardware limit, the controller 28 determines whether the hopping frequency window is less than the hopping frequency window policy limit, which may depend on the current deployment, location, and time of day, and similar factors as determined and transmitted to the communication device by the external command device 32 (Block 210). Similar hopping frequency window policy limit factors may be employed using the same factors when deciding to increase the hop rate. It is desirable not to have the communication device 12 reveal its hardware limitations unless there are special missions, first responder emergencies, or war, in which case a maximum hop rate and maximum hopping frequency window as is technically feasible may be desired. By this process, it is possible for the communication device 12 to trick a jammer into believing all authorized and available frequencies are being used without indicating to the jammer the limits of the hardware in the communication device.

If the selected hopping frequency window is below a hopping frequency window policy limit, a new hopping frequency window is set (Block 212). The new hopping frequency window is communicated to other devices, such as the remote communication device (Block 214). The hopping frequency window is increased (Block 216). This increase may occur at a minimum rate that exceeds the demonstrated jammer capability based on the spectrum data obtained from the RF detector 20. The minimum increase rate may have been set by the external command device 32. The existing signaling mechanism may be used to signal the selected hopping frequency window to other communication devices, such as the remote communication device 50 illustrated in FIG. 1. The process ends (Block 218).

Similar to the process of selecting the hopping rate, the hopping frequency window may be selected by sensing the RF spectrum over a period L. The average number of interfered frequencies N may be counted as an average number in a set S. If the average number of interfered frequencies is less than the absolute value of the set S and greater than a threshold established beforehand, then the controller 28 may determine that the hopping frequency window is compromised, and as a result, the hopping frequency window may be increased by an additive increase per design constant U. The new hopping frequency window may be equal to the previous hopping frequency window plus the design constant U. For an uncompromised hopping frequency window, on the other hand, when there are no interfering signals, the controller 28 may periodically test the hopping frequency window using a smaller hopping frequency window as a smaller bandwidth and evaluate the observed spectrum data and measured packet error rate and decrease the hopping frequency window toward a design constant D. The new hopping frequency window may be equal to the previous hopping frequency window divided by the constant D. While operating from one engagement to another engagement, it is desirable that the observed behavior of the communication system 10 from a prior engagement be insufficient to give advantage to a jammer 34 in a subsequent engagement. It is possible to add randomization to the hop rate increase and decrease, e.g., new_rate=old_rate+(U+random_value). The same holds true for the hop window increase and decrease.

The communication system 10 may provide a reserve frequency hopping framework that provides a threat-adaptive protection to spread spectrum frequency hopping communications. The selected hopping rate may start slow and increase only as fast as required according to a detected threat, and likewise, the hopping frequency window may start narrow and widen only as wide as required according to a detected threat.

The communication system 10 may be applied to various frequency hopping waveforms including Arrow, Quick Look 3/4 and Specter. For example, the Arrow system may use a CFA mode mechanism and three implemented rates, e.g., QL1, QL2, and QL3, to decide a new rate as an input to an established algorithm.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communication system comprising:
   a radio frequency (RF) detector;
   an RF transmitter having a selectable hopping rate, a selectable hopping frequency window, and a hardware hopping rate limit; and
   a controller having a hopping rate policy limit settable via an external command to be less than the hardware hopping rate limit of the RF transmitter, the controller configured to operate the RF transmitter at a selected hopping rate within the hopping rate policy limit and at a selected hopping frequency window based upon the RF detector.

2. The communication system of claim 1 wherein the controller is configured to operate the RF transmitter at the selected hopping rate based upon a detected interference from the RF detector.

3. The communication system of claim 1 wherein the controller is configured to operate the RF transmitter at the selected hopping frequency window based upon a detected interference from the RF detector.

4. The communication system of claim 1 wherein the RF transmitter has a hardware frequency window limit; and wherein the controller has a hopping frequency window policy limit settable via an external command to be less than the hardware hopping frequency window of the RF transmitter; and wherein the selected hopping frequency window is within the hopping frequency window policy limit.

5. The communication system of claim 1 wherein the controller is configured to operate the RF transmitter at a higher selected hopping rate when the RF detector detects a higher interference, and at a lower selected hopping rate when the RF detector detects a lower interference.

6. The communication system of claim 1 comprising a remote RF receiver in communication with the RF transmitter and configured to operate at the selected hopping rate and selected hopping frequency window.

7. A communication device comprising:
   a portable housing;
   a radio frequency (RF) detector carried by the portable housing;
   an RF transmitter carried by the portable housing and having a selectable hopping rate, a selectable hopping frequency window, and a hardware hopping rate limit;
   an RF receiver carried by the portable housing; and
   a controller carried by the portable housing and having a hopping rate policy limit settable via an external command to be less than the hardware hopping rate limit of the RF transmitter, the controller configured to operate the RF transmitter at a selected hopping rate within the hopping rate policy limit and at a selected hopping frequency window based upon the RF detector.

8. The communication device of claim 7 wherein the controller is configured to operate the RF transmitter at the selected hopping rate based upon a detected interference from the RF detector.

9. The communication device of claim 7 wherein the controller is configured to operate the RF transmitter at the selected hopping frequency window based upon a detected interference from the RF detector.

10. The communication device of claim 7 wherein the RF transmitter has a hardware frequency window limit; and wherein the controller has a hopping frequency window policy limit settable via an external command to be less than the hardware hopping frequency window of the RF transmitter; and wherein the selected hopping frequency window is within the hopping frequency window policy limit.

11. The communication device of claim 7 wherein the controller is configured to operate the RF transmitter at a higher selected hopping rate when the RF detector detects a higher interference, and at a lower selected hopping rate when the RF detector detects a lower interference.

12. A method for communication comprising:
using a controller to operate an RF transmitter at a selected hopping rate within a hopping rate policy limit and at a selected hopping frequency window based upon an RF detector; and
setting the controller, via an external command, at the hopping rate policy limit to be less than a hardware hopping rate limit of the RF transmitter.

13. The method of claim 12 wherein using the controller comprises using the controller to operate the RF transmitter at the selected hopping rate based upon a detected interference from the RF detector.

14. The method of claim 12 wherein using the controller comprises using the controller to operate the RF transmitter at the selected hopping frequency window based upon a detected interference from the RF detector.

15. The method of claim 12 comprising setting the controller, via an external command, at a hopping frequency window policy limit to be less than a hardware hopping frequency window of the RF transmitter; and wherein the selected hopping frequency window is within the hopping frequency window policy limit.

16. The method of claim 12 wherein using the controller comprises using the controller to operate the RF transmitter at a higher selected hopping rate when the RF detector detects a higher interference, and at a lower selected hopping rate when the RF detector detects a lower interference.

17. The method of claim 12 comprising using a remote RF receiver in communication with the RF transmitter to operate at the selected hopping rate and selected hopping frequency window.

18. A communication system comprising:
a radio frequency (RF) detector;
an RF transmitter having a selectable hopping rate, a selectable hopping frequency window, and a hardware hopping frequency window limit; and
a controller having a hopping frequency window policy limit settable via an external command to be less than the hardware hopping frequency window limit of the RF transmitter, the controller configured to operate the RF transmitter at a selected hopping rate and at a selected hopping frequency window within the hopping frequency window policy limit based upon the RF detector.

19. The communication system of claim 18 wherein the controller is configured to operate the RF transmitter at the selected hopping rate based upon a detected interference from the RF detector.

20. The communication system of claim 18 wherein the controller is configured to operate the RF transmitter at the selected hopping frequency window based upon a detected interference from the RF detector.

21. The communication system of claim 18 wherein the controller is configured to operate the RF transmitter at a higher selected hopping rate when the RF detector detects a higher interference, and at a lower selected hopping rate when the RF detector detects a lower interference.

22. The communication system of claim 18 comprising a remote RF receiver in communication with the RF transmitter and configured to operate at the selected hopping rate and selected hopping frequency window.

23. A method for communication comprising:
using a controller to operate an RF transmitter at a selected hopping rate within a hopping frequency window policy limit and at a selected hopping frequency window based upon an RF detector; and
setting the controller, via an external command, at the hopping frequency window policy limit to be less than a hardware hopping rate limit of the RF transmitter.

24. The method of claim 23 wherein using the controller comprises using the controller to operate the RF transmitter at the selected hopping rate based upon a detected interference from the RF detector.

25. The method of claim 23 wherein using the controller comprises using the controller to operate the RF transmitter at the selected hopping frequency window based upon a detected interference from the RF detector.

26. The method of claim 23 wherein using the controller comprises using the controller to operate the RF transmitter at a higher selected hopping rate when the RF detector detects a higher interference, and at a lower selected hopping rate when the RF detector detects a lower interference.

27. The method of claim 23 comprising using a remote RF receiver in communication with the RF transmitter to operate at the selected hopping rate and selected hopping frequency window.

\* \* \* \* \*